United States Patent [19]

Nee et al.

[11] Patent Number: 4,729,940
[45] Date of Patent: Mar. 8, 1988

[54] METHOD OF MANUFACTURING MASTER FOR OPTICAL INFORMATION CARRIER

[75] Inventors: Hanphire H. Nee; Vasil D. Tasi, both of Stamford, Conn.

[73] Assignee: CBS Inc., New York, N.Y.

[21] Appl. No.: 863,905

[22] Filed: May 16, 1986

[51] Int. Cl.⁴ .............................................. G03C 5/00
[52] U.S. Cl. ................................... 430/323; 430/329; 430/397; 430/945; 346/76 L; 204/129.6; 204/129.65; 204/129.95
[58] Field of Search .............. 430/320, 321, 945, 323, 430/329, 397; 204/129.6, 129.65, 129.95, 129.75; 346/76 L

[56] References Cited

U.S. PATENT DOCUMENTS 3,894,179 7/1975 Jacobs et al. ..................... 178/6.6 R
4,356,254 10/1982 Takahashi et al. .................. 430/296
4,423,137 12/1983 Rester .................................. 430/320

OTHER PUBLICATIONS

Miyaoka, "Manufacturing Technology of the Compact Disc," Digital Audio, pp. 196-201.
Castrignano, "Video Disc Technology-A Tutorial Survey," J. Photographic (Applied) Engineering, vol. 4 (1), 1978, pp. 1-8.

Primary Examiner—John E. Kittle
Assistant Examiner—José G. Dees
Attorney, Agent, or Firm—Brumbaugh, Graves, Donohue & Raymond

[57] ABSTRACT

For manufacturing a master for the replication of optical discs a plate of fine-grained copper is coated with a photoresist and exposed by a laser beam which is turned on and off in accordance with information to be recorded on the disc. After developing the photoresist, the exposed portions of the copper layer is etched to a predetermined depth and the photoresist stripped from the etched copper surface.

14 Claims, 5 Drawing Figures

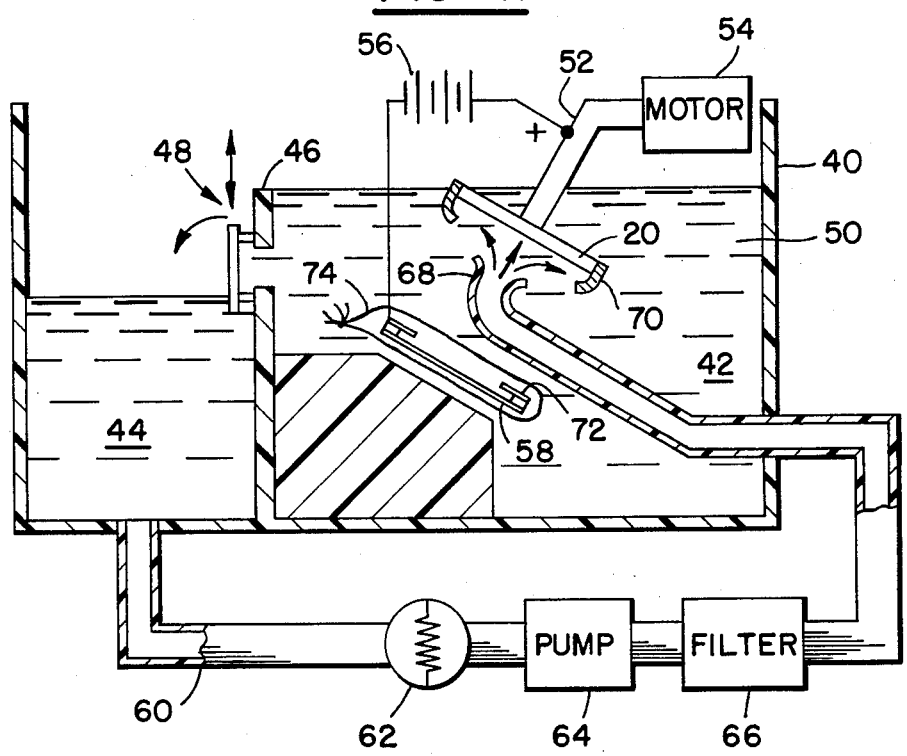

METHOD OF MANUFACTURING MASTER FOR OPTICAL INFORMATION CARRIER

BACKGROUND OF THE INVENTION

This invention relates to information carriers of the optical type and, more particularly, to a method and apparatus for manufacturing masters for replication of optical discs.

The manufacturing method according to the invention is particularly suitable for the manufacture of masters for the Compact Disc, an optical disc on which audio information is stored as discrete pits along a spiral information track of predetermined pitch. The current standard for the compact digital audio disc calls for a track pitch of 1.6 microns, a track width of 0.6 micron and a pit depth of 0.12 micron, this pit depth providing a sufficient difference in intensity between light reflected from the land and the pits to provide tracking information for the disc player.

In the current process for making masters for the replication of the compact optical disc, a film of chromium or other adhesion promoting material is deposited on a polished glass disc to provide adhesion between the glass surface and a layer of photoresist material. A positive photoresist layer is then applied to the chromium surface by a spinning coater or other suitable means, the thickness of this layer being maintained within a narrow range of 0.11 to 0.13 microns over the recording area of the disc. The photoresist-coated glass blank is then placed on a turntable and while being rotated at a predetermined speed is exposed with a focused laser beam having a spot size of approximately 0.6 micron, with the laser beam moved at a constant feed along the radial direction of the rotating disc. The laser beam is modulated or turned on and off at a predetermined rate by an acousto-optic modulator.

After recording, the exposed photoresist is developed by immersion in a suitable chemical solution to remove the areas that have been exposed to the laser beam. Thus, the developed disc, often called a master, contains a continuous spiral track of discrete pits which correspond to the recorded information. The process thereafter from master to stamper forming is similar to the electroplating process of an ordinary analog LP disc, consisting essentially of coating the developed photoresist with a conductive layer and then subjecting the substrate to nickel electroforming. This nickel replication of the information record is separated from the substrate and used as a stamper to press or mold plastic discs having the same pattern of discrete pits as the developed photoresist.

Because in this prior art process the depth of the pits in the final stamper is controlled by the thickness of the photoresist layer, the thickness of the photoresist must be controlled within a very narrow range around 0.12 micron and, moreover, the process cannot tolerate any defects on the surface of the substrate significantly larger than 0.1 micron, thus putting severe constraints on the manufacturing process. Another disadvantage of this known process is that only one nickel replication can be made from the photoresist surface because the pattern on the photoresist is destroyed in the process of separating the nickel stamper from the photoresist, thus making the process relatively expensive for mass production.

An earlier process capable of producing a more durable master described in U.S. Pat. No. 3,894,179 comprises the steps of coating a disc-shaped glass plate with an etchable silicon oxide layer of predetermined thickness, coating the silicon oxide layer with a thin metal film such as chromium, coating the metal film with photoresist, rotating the disc relative to a focused laser beam, intermittently exposing the photoresist for variable periods which correspond to the information to be recorded, developing the photoresist, and etching the exposed portions of the metal layer and the silicon oxide layer by sputter etching or by means of a photolithographic process. The depth of the pits being determined by the thickness of the silicon oxide layer, this thickness must be controlled to extremely close tolerances, and because the sputtering process preferred for etching is performed in a vacuum, the process is relatively expensive.

Thus, the need exists for an improved method for manufacturing masters for optical discs which will result in a more durable and less costly master than those produced by present methods, and which can be carried out with a minimum of apparatus and attention. Accordingly, the primary object of the present invention is to provide a process for manufacturing an optical disc master that is sufficiently durable to make multiple nickel replications therefrom, thereby to lower the manufacturing cost of optical discs.

Another object is to provide a method for manufacturing optical disc masters which eliminates the disadvantage of the conventional process of requiring extremely close tolerances on the thickness of the photoresist coating.

A corollary object is to provide a process for making optical disc masters which utilizes a photoresist coating as an etch mask so as to greatly relax the tolerances on the thickness and uniformity of the photoresist coating.

SUMMARY OF THE INVENTION

Generally speaking, the method according to the invention suitable for manufacturing a disc-shaped information carrier provided with a spiral information track is characterized in that a metallic substrate such as copper, aluminum or stainless steel is coated, as by electroplating, with copper having a fine-grained microstructure, and after machining the surface of the copper to an optical finish it is coated with a layer of photoresist to a thickness sufficient to resolve the discrete information pits. The photoresist is then exposed and non-exposed in a pattern which corresponds to the information. The photoresist layer, the exposed areas of which are removed by development, is used as an etch mask for the subsequent etching of the copper. The copper is electrolytically etched, the depth and sidewall geometry of the etched pits being controlled by a selected combination of process parameters such as temperature and pH of the electrolyte and current density. After etching the copper to the desired depth, the photoresist etch mask is stripped from the surface and, after cleaning and inspection, the etched copper disc is ready for nickel electroforming to produce a nickel replication of the information record. The copper master is sufficiently durable to withstand the making of multiple nickel replications, thereby significantly reducing the manufacturing cost of optical discs.

BRIEF DESCRIPTION OF THE DRAWINGS

Other objects, features and advantages of the invention, and a better understanding of the improved process and apparatus for carrying it out, will be had from the following detailed description, taken in conjunction with the accompanying drawings, in which:

FIG. 4 is a diagrammatic representation of apparatus for carrying out the electrolytic etching step of the improved method.

DETAILED DESCRIPTION OF PREFERRED EMBODIMENTS

Figure 1:
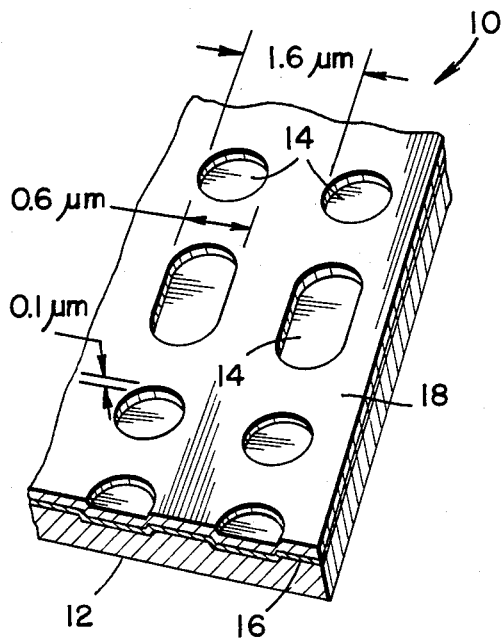
FIG. 1 is a greatly enlarged view of a portion of an optical disc showing the nature and dimensions of the information pits.

Referring now to the figures, FIG. 1 is an enlarged representation of a fragment 10 of a compact disc which consists of a transparent substrate 12 in which information pits 14 are formed in the molding or pressing process. The surface of the substrate in which the pits are impressed is covered with an aluminum reflective layer 16 and a protective layer 18. The pits are 0.12 micron deep and may be generally circular or elongated, depending on the information, and are arranged along a spiral information track having a width of 0.6 micron and a track pitch of approximately 1.6 microns. The purpose of the present invention is to provide a method for manufacturing the master from which stampers for molding or pressing the illustrated compact disc can be made.

Figure 2:
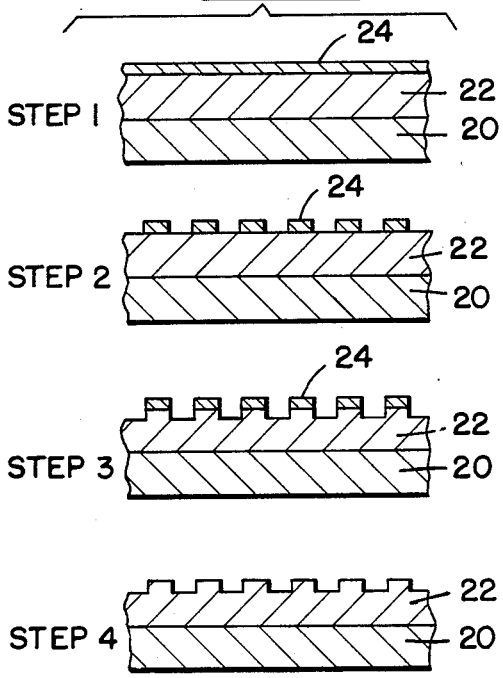
FIG. 2 shows four successive stages in the formation of the information carrier obtained by the improved method.

Referring now to FIG. 2, which shows four successive stages in the formation of a compact disc master obtained by the improved method, reference numeral 20 denotes a metallic disc-shaped substrate such as copper, aluminum or stainless steel which is coated with copper by electroplating, vacuum coating or other suitable process capable of producing a microstructure having a grain size of less than 0.1 micron. A copper plating process in which the bath is formed by combining a solution containing 180 to 220 grams/liter of copper sulfate penta-hydrate ($CuSO_4 \cdot 5H_2O$) and 55 to 65 grams/liter of sulphuric acid and 30 to 60 parts per million of chloride ion, and a suitable amount of organic brightener which may consist of about 1 to about 15 grams/liter of a polyether having a molecular weight from about 4,000 to about 10,000, about 0.3 to about 3.0 milligrams/liter of 1-lower alkyl-2-mercapto imidazole, and about 1 to about 100 milligrams/liter of a sulfonated, sulfurized benzene compound, is eminently suitable for controlling the grain-size and making the copper essentially amorphous. After machining the surface of the copper layer flat by known methods such as grinding, turning and lapping, or by diamond turning, to an optical finish free of scratches and microscopic irregularities, it is coated with a layer 24 of photo-resist by a spinning coater. Neither the thickness nor the uniformity of thickness are very critical, the only requirement being that in its function as an etch mask the thickness is sufficient to resolve the information pits.

Figure 3:
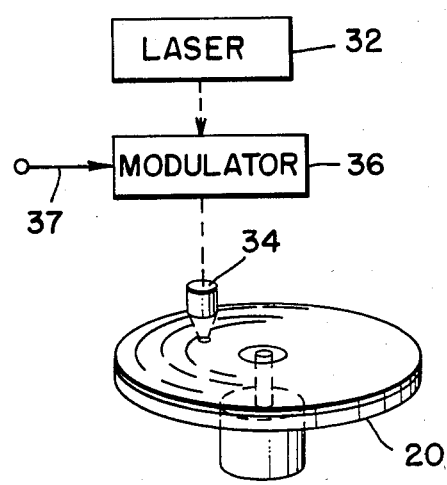
FIG. 3 is a diagrammatic representation of apparatus for carrying out the recording step of the process.

Utilizing the known and typical recording apparatus diagrammatically shown in FIG. 3, the circular photoresist-coated disc 20 is rotated about its axis by suitable driving means (not shown) and is moved radially with respect to an optical system disposed above the disc by which light from a laser 32 is focused onto the plate by an objective lens 34 to a spot size of approximately 0.6 micron. A light modulator 36 in the path of the radiation from laser 32 to lens 34 causes the intensity of the spot of light to be modulated in accordance with information signals applied to the terminal 37 of the modulator. As the focused laser beam is moved radially with respect to the substrate 20 the photoresist layer on plate 20 is intermittently exposed and non-exposed in accordance with the information along a spiral track. The photoresist is then developed by immersion in a chemical solution designed to remove the exposed areas, as depicted in Step 2 in FIG. 2, and, as has been noted earlier, the photoresist that remains is used as an etch mask for subsequent etching of the copper layer.

Using etching apparatus diagrammatically shown in FIG. 4, the copper layer 22 is electrolytically etched by connecting it as an anode immersed in an etching bath. The etching apparatus includes a tank 40 fabricated from a suitable electrically insulating material which will not be attacked by the electrolyte, such as fiberglass, the interior of which is divided into a major compartment 42 and a side compartment 44 by a vertical wall 46 having a controllable dam 48 along its upper edge for controlling the level of the electrolyte solution 50 in the main compartment. The disc-shaped substrate 20 is electrically connected to an inclined conductive shaft 52 adapted to be driven in rotation at a rate in the range of 20 to 100 rpm by a suitable motor 54. The positive terminal of a source of D.C. potential, represented as a battery 56, is connected to shaft 52 and the negative terminal is electrically connected to a cathode 58, which preferably is in the form of a disc-shaped metal sheet suitably supported to be parallel to and concentric with the rotatable substrate.

The electrolyte 50 is continuously circulated, the flow path being from side compartment 44 through a pipe 60 to a heater 62 for controlling its temperature, through a circulating pump 64 and a filter 66 and then to a nozzle 68 for projecting the electrolyte onto the developed photoresist/copper surface. The electrolyte in the main compartment overflows the dam 48, the height of which is adjustable, as indicated by the arrow, to control the level of the solution in the main compartment 42.

Nozzle 68 is disposed substantially on the axis of rotation of substrate 20 and insures that freshly filtered electrolyte impinges on the photoresist-covered copper disc and carries away the copper ions dissolved in the electrolyte. The current density distribution, which affects the uniformity of depth of etch, is controlled by adjusting the shape and size of an annular ring 70 removably secured to the periphery of disc 20; this ring is formed of an electrically insulating, plastic material and has a turned-in lip which, when the disc is rotated, helps insure a uniform etch depth over the entire copper surface. An annular-shaped baffle 72 secured to cathode 58 and lying between the cathode and disc 20 provides further control of current density distribution. The cathode and baffle are enclosed in a cathode bag 74 formed of a fabric made from a suitable insulating material, such as polypropylene, for collecting copper particles that plate out on the cathode during the etching process as loosely adhered particles.

A suitable electrolyte for etching the copper surface is a water solution of an alkali metal pyrophosphate or ammonium pyrophosphate, for example tetra-potassium pyrophosphate ($K_4P_2O_7$) or tetra-sodium pyrophosphate ($Na_4P_2O_7$) or mixtures thereof, with a concentration of the pyrophosphate in the range between approximately 0.5% to saturated solution and preferably in the range between 1.0% and 7.0%. The pH of the bath may range from about 7 to about 10 and preferably is at 8. The temperature of the etching solution may be in the range from room temperature to about 90° C. and is preferably maintained, by heater 62, in the range between 50° C. to 70° C. The copper is etched at a current density in the range from approximately 0.1 ampere per square foot to approximately 4.0 amperes per square foot, and is preferably done at a current density of 1.0 to 2.5 amperes per square foot. During the etching process, the electric current removes the copper at the areas where there is no photoresist and after operation for extended periods of time the copper ions accumulate in the electrolyte and plate out on the cathode 58 as loosely adhered particles, which are collected in the cathode bag. The anode or etch efficiency of the bath is generally in the range between 95% to 105% and is preferably kept in the range between 100% to 103% by adjusting the current density and temperature and pH of the bath. With temperature and pH maintained at the preferred values indicated above and using a current density of 2.5 amperes per square foot, the copper on a disc having a diameter of 120 millimeters (the diameter of the Compact Disc) is etched to the required depth of approximately 0.12 micron in about two minutes.

To promote more consistent etching, a wetting agent for lowering the surface tension is added to the etching solution. Wetting agents of anionic nature such as fatty alcohol sulfates and sodium alkyl sulfanates, linear or branched, are generally satisfactory. The fatty alcohol sulfates are represented by the linear alkyl type $C_nH_{2n+1}OSO_3Na$, where n can have a value in the range between about 10 to about 20, such as sodium lauryl sulfate,

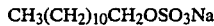

or the branched alkyl type such as sodium 2-ethylhexyl sulfate,

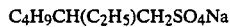

sodium 2-n-butyl-octyl-sulfate, and the like, with carbon atoms in the range between about 8 to about 20. Compounds of the sodium alkyl benzene sulfate type, such as sodium dodecylbenzene sulfate,

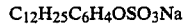

also fall in this category. Compounds of the type enumerated above, except with the sulfate group replaced by a sulfonate group, are also satisfactory wetting agents; examples are compounds of the type $C_nH_{2n+1}SO_3Na$ and the branched type such as sodium-2-ethyl-hexylsulfonate,

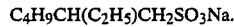

Depending on the specific compound and its solubility in water, a single compound or a combination of two or more can be added to the electrolyte in a concentration ranging from about 0.05% to about 1.0%, preferably between 0.10% to 0.75%.

After the copper has been etched to the required depth, depicted in Step 3, the photoresist 24 is stripped from the copper surface and, after rinsing and drying, the etched master (Step 4) is ready for nickel electroforming.

An important advantage of an etched metal master over the conventional photoresist-on-glass master is that multiple nickel replications can be made from the metal master, whereas only one can be made from the conventional master, thus significantly reducing the manufacturing cost of compact discs. Because the copper is conductive, the present invention has the further advantage of eliminating the step in the photoresist-on-glass technique of initially applying a conductive coating to the substrate. Since in the process according to the invention the photoresist is used as an etch mask, its thickness is not critical, and it can also be substantially thicker than the depth of the pits, thereby to reduce the chances of pin holes or other defects in the photoresist. In short, the parameters of the process according to the invention are much less critical than those of the photoresist-on-glass technique, all of which reduces the cost and improves the yield compared to the current process.

Figure 5:
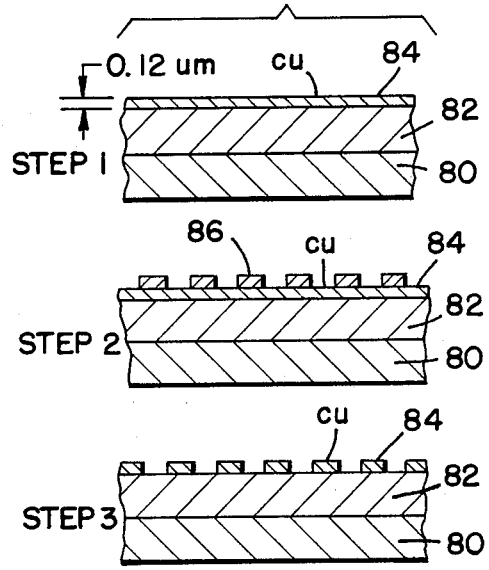
FIG. 5 shows three successive stages in the formation of the information carrier obtained by an alternative method embodying the principles of the invention.

In an alternative method of manufacturing optical disc masters utilizing the principles of the present invention, depicted in FIG. 5, a suitable metal substrate 80 is coated with a layer 82 of inert material, such as electroless nickel. After diamond-turning or otherwise machining the surface of layer 82 to an optical finish, the surface is coated, as by the earlier-described electroplating process, with a layer of fine-grained copper to a thickness corresponding to the required depth of the information pits; as indicated in Step 1 in FIG. 5, the thickness of the copper layer is 0.12 micron. The copper surface is then coated with a layer 86 of photoresist, the thickness of which is not critical, which is then subjected to conventional laser exposure to record information therein along a spiral track. Following development of the photoresist 86, depicted in Step 2, and using the photoresist as an etch mask and the above-described electroplating process, the exposed copper is completely etched away. Since the electroless nickel is very corrosion resistant compared to copper, after the copper is etched down to the nickel the etch current drops appreciably and signals the end of the etch time. After etching and stripping of the photoresist, the result is the structure shown in Step 3, which after cleaning and inspection is ready for nickel electroforming. This structure, like the structure shown in Step 4 in FIG. 2, is sufficiently durable to make multiple replications.

While the foregoing describes the use of the improved process for manufacturing masters for the compact audio disc (CD), it will be recognized and understood that the process is equally applicable in the manufacture of masters for information storage discs of other types in which information is stored on a disc-shaped carrier in the form of pits of predetermined shape and depth. For example, masters for storage discs of either the write-once or the erasable categories, which are pre-grooved to provide tracking of the "reading" laser beam, may also be manufactured by the described process.

It is to be understood, also, that the photoresist may be exposed in ways other than rotating the substrate relative to a modulated focused laser beam and still retain the advantages of the process. For example, the photoresist may be exposed with ultra-violet light through a pre-made mask containing a sequence of spaced apertures representing an information signal arranged along a spiral recording track, and thereafter developing the photoresist and electrolytically etching the exposed portion of the copper layer. This alternative exposure step is equally applicable to the processes depicted in FIGS. 2 and 5.

Although the invention has been described in detail with reference to the presently preferred embodiments, various modifications can be made by one of ordinary skill in the art without departing from the spirit and scope of the invention. Accordingly, it is intended that the invention be limited only by the appended claims.

We claim:

1. Method of manufacturing a disc-shaped information carrier provided with a substantially spiral track of information pits of predetermined depth, comprising the steps of:

coating a metallic disc-shaped substrate with a layer of fine-grained copper to a thickness at least as great as the predetermined depth of the information pits, coating the surface of the copper layer with a photoresist, exposing the photoresist to radiation in a sequence of spaced areas which correspond to the information arranged in a spiral track, developing the photoresist, electrolytically etching the exposed portions of the copper layer to said predetermined depth in an electrolyte comprising a water solution of compounds selected from the group consisting of tetra-potassium pyrophosphate and tetra-sodium pyrophosphate in which the concentration of the pyrophosphate is in the range from about 1.0% to about 7.0% and the pH of the solution is in the range from about 7 to about 10, and stripping the photoresist from the etched copper surface.

2. Method as claimed in claim 1, wherein the thickness of said copper layer is greater than said predetermined depth of the information pits.

3. Method as claimed in claim 1, wherein said metallic substrate is electroless nickel, and said copper layer has a thickness equal to said predetermined depth of the information pits.

4. Method as claimed in claim 1, wherein the step of electrolytically etching comprises the steps of placing the electrolyte in an etching tank, immersing said substrate in the electrolyte and supporting it in spaced apart parallel relationship with respect to an immersed metallic disc-shaped cathode, with the developed photoresist facing the cathode, applying a direct current potential between the cathode and said substrate as the anode, rotating said substrate about its axis, and directing a jet of electrolyte against the rotating developed photoresist for uniformly etching the exposed copper.

5. Method as claimed in claim 1, including the further step of adding an anionic wetting agent to the electrolyte for lowering its surface tension for consistent etching.

6. Method as claimed in claim 5, wherein said wetting agent is selected from the group consisting of fatty alohol sulfates of the linear alkyl type and sodium linear or branched alkyl sulfonates, and has a concentration in the range from about 0.10% to about 0.75%.

7. Method as claimed in claim 1, wherein the step of exposing the photoresist comprises rotating the disc-shaped substrate relative to a focused laser beam and intermittently exposing the photoresist for variable periods which correspond to the information.

8. Method as claimed in claim 1, wherein the step of exposing the photoresist comprises exposing the photoresist layer to ultra-violet light through a mask containing a sequence of spaced apertures representing an information signal arranged along a spiral track.

9. Method as claimed in claim 7, wherein the thickness of said copper layer is greater than said predetermined depth of the information pits.

10. Method as claimed in claim 7, wherein said metallic substrate is electroless nickel, and said copper layer has a thickness equal to said predetermined depth of the information pits.

11. Method as claimed in claim 7, wherein said electrolyte is a water solution of compounds selected from tetra-potassium pyrophosphate and tetra-sodium pyrophosphate in which the concentration of the pyrophosphate is in the range from about 1.0% to about 7.0% and the pH of the solution is in the range from about 7 to about 10.

12. Method as claimed in claim 7, wherein the step of electrolytically etching comprises the steps of placing the electrolyte in an etching tank, immersing said substrate in the electrolyte and supporting it in spaced apart parallel relationship with respect to an immersed metallic disc-shaped cathode, with the developed photoresist facing the cathode, applying a direct current potential between the cathode and said substrate as the anode, rotating said substrate about its axis, and directing a jet of electrolyte against the rotating developed photoresist for uniformly etching the exposed copper.

13. Method as claimed in claim 7, including the further step of adding an anionic wetting agent to the electrolyte for lowering its surface tension for consistent etching.

14. Method as claimed in claim 13, wherein said wetting agent is selected from the group consisting of fatty alcohol sulfates of the linear alkyl type and sodium linear or branched alkyl sulfonates, and has a concentration in the range from about 0.10% to about 0.75%.

* * * * *